(No Model.)
2 Sheets—Sheet 1.
G. A. KELLY.
MOLD BOARD FOR PLOWS.
No. 346,480. Patented Aug. 3, 1886.
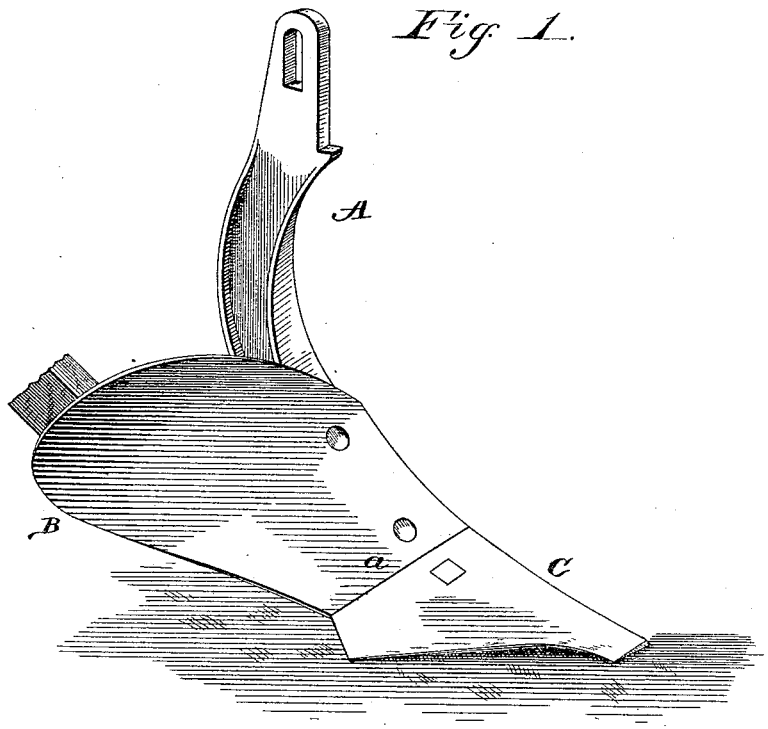
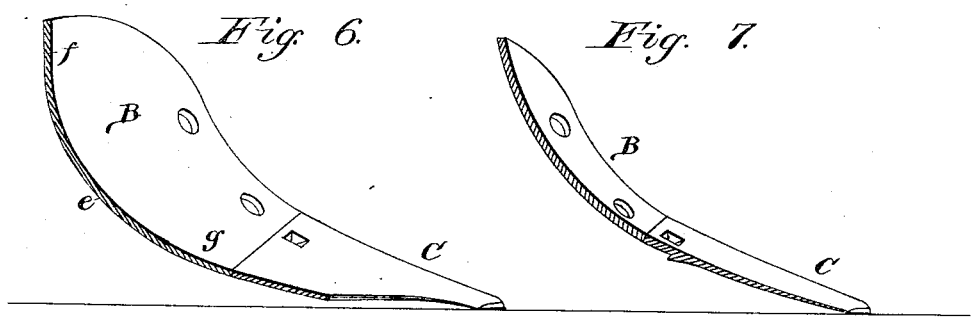
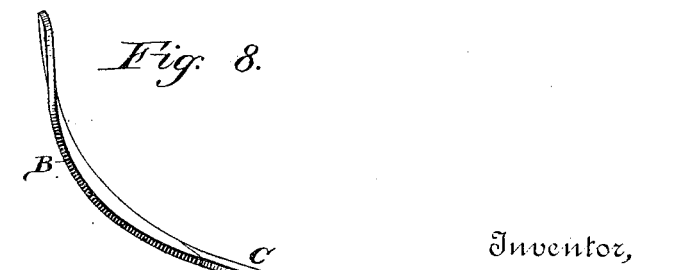
Witnesses
Roy C. Bowen
H. F. Beruhas
Inventor,
George A. Kelly
By his Attorneys
C. A. Snow & Co.
N. PETERS, Photo-Lithographer, Washington, D. C.

(No Model.) 2 Sheets—Sheet 2.

G. A. KELLY.
MOLD BOARD FOR PLOWS.

No. 346,480. Patented Aug. 3, 1886.

Witnesses
Percy C. Bowen.
W. F. Beruhard

Inventor,
George A. Kelly.
By his Attorneys
C. A. Snow & Co.

UNITED STATES PATENT OFFICE.

GEORGE A. KELLY, OF LONGVIEW, TEXAS, ASSIGNOR TO THE LONGVIEW KELLY PLOW MANUFACTURING COMPANY, OF SAME PLACE.

MOLD-BOARD FOR PLOWS.

SPECIFICATION forming part of Letters Patent No. 346,480, dated August 3, 1886.

Application filed April 29, 1886. Serial No. 200,580. (No model.)

*To all whom it may concern:*

Be it known that I, GEORGE A. KELLY, a citizen of the United States, residing at Longview, in the county of Gregg and State of Texas, have invented a new and useful Improvement in Mold-Boards for Plows, of which the following is a specification.

My present invention relates to improvements in mold-boards for plows; and it consists of the peculiar construction and arrangement of parts, substantially as hereinafter fully set forth, and particularly pointed out in the claims.

The primary object of my invention is to provide an improved plow which is especially adapted for the cultivation of sandy soil in the southern cotton-growing districts, which shall thoroughly and effectually disarrange and break the furrow-slice during its transit on and over the mold-board, and, furthermore, completely capsize or invert the slice at the point of delivery, so that the soil is effectually pulverized and deposited on the field high enough for planting cotton-seed, and for protecting them from the accession of moisture during the spring-time of the year, which are very important objects to be attained by a plow adapted for the uses above described.

A further object of my invention is to provide an improved plow which shall be very light and easy of draft, simple and strong in construction, and cheap.

Figure 2:
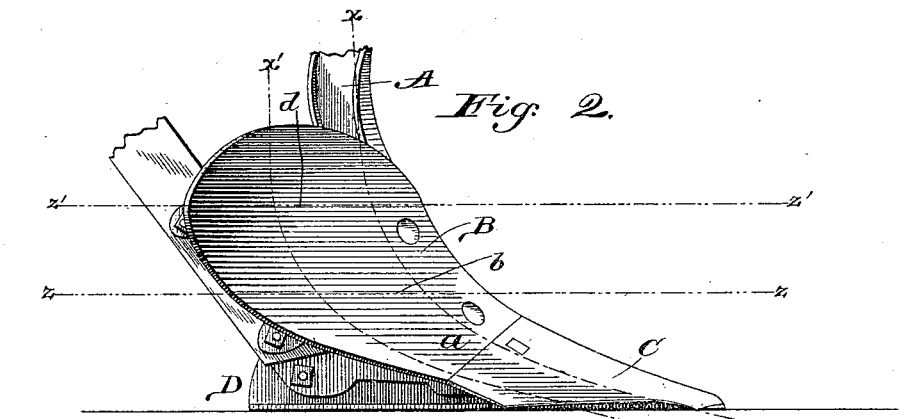
Figure 3:
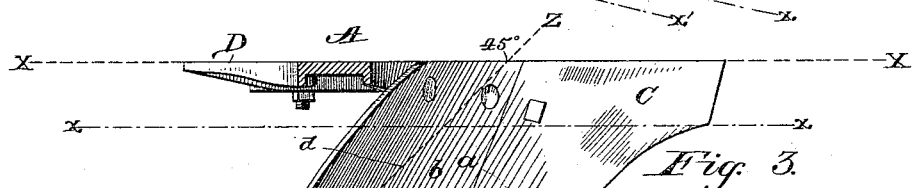
Figure 4:
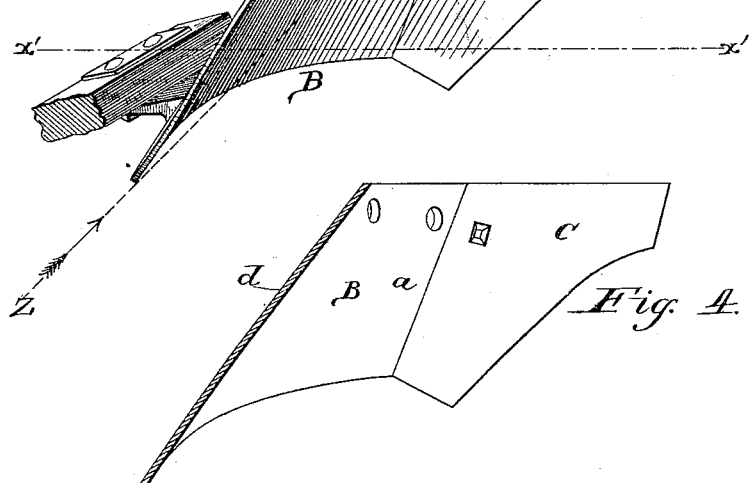
Figure 5:
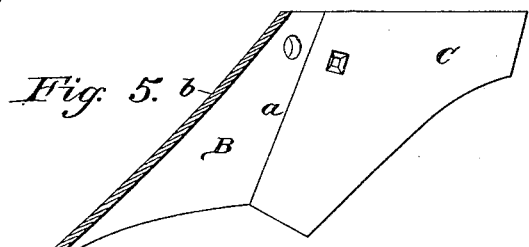

In the accompanying drawings, Figure 1 is a perspective view of a plow having a mold-board applied thereto, embodying my invention. Fig. 2 is a side elevation thereof. Fig. 3 is a top plan view of the device as shown in Fig. 2. Fig. 4 is a horizontal sectional view taken transversely across the mold-board on the line $z'\ z'$ of Fig. 2. Fig. 5 is a similar sectional view on the line $z\ z$ of the same figure. Fig. 6 is a vertical longitudinal sectional view on the line $x'\ x'$ of Figs. 2 and 3. Fig. 7 is a similar sectional view on the lines $x\ x$ of the same figures. Fig. 8 is an edge view of the mold-board, looking in the direction indicated by the arrow on the dotted line Z Z in Fig. 3.

Referring to the drawings, in which like letters of reference indicate corresponding parts in all the figures, A designates the standard or stock, which carries my improved mold-board B, the share C, and the landside D, the share and the landside being of the class known in a prior patent issued to me on the 30th day of June, 1885, and bearing number 321,224; but, as the present invention is confined exclusively to the mold-board, I have not deemed it necessary that the share and landside shall be shown in detail.

In Fig. 3 of the drawings the dotted line X X represents the line of draft of the plow, and the mold-board is set at an angle or inclination of forty-five (45) degrees to the said line of draft, as indicated by the dotted line Z Z in said Fig. 3, so that the plow will move easily and reduce the strain and draft thereon to a minimum, whereby a plow of very light draft is produced.

The working-surface of the mold-board is of peculiar form, and I will now proceed to describe relative arrangement and positions of its curved and angular or plane faces.

At the line where the lower edge of the mold-board joins the share the working-surface thereof is bulged outwardly or concaved slightly in horizontal transverse section, as at $a$, and this bulged or concaved surface of the mold-board gradually increases as the surface of the mold-board approaches the line or point $b$ thereon, on which the dotted line $z\ z$ in Fig. 2 is drawn. At this latter-mentioned point or line the mold-board is bulged or concaved outwardly in horizontal and transverse section greater than at either the upper or lower ends thereof, as clearly shown in Fig. 5 of the drawings, and as the working-surface approaches the point of delivery of the furrow-slice, or at its upper edges, the transverse or horizontal curvature of the mold-board again diminishes, the same as toward the lower edge, the working-surface at the upper edge being very nearly in a straight line, as indicated by the letter $d$ and at the dotted line $z'\ z'$ in Fig. 2. By forming this undulating or wave-like surface the furrow-slice, as it moves over the same, is caused to partake of its configuration, and the particles of the slice are disarranged by the gradually-increased curvature at the lower edge and middle of the mold-board, so that by the time it reaches the upper transversely-curved surface at the point of delivery it is completely broken or disarranged before or simultaneously with its leaving the delivery-point of the mold-board by which it is capsized.

The mold-board is of very gradual convexity in vertical section, as shown by Figs. 6 and 7 of the drawings. In the sectional view, Fig. 6 of the drawings, and at the middle of the longitudinal axis, the mold-board has a deep convexity, as at $e$, which assumes an approximately straight and lies in a vertical line, as at $f$, as it approaches the upper edge of the mold-board, while the lower extremity of the latter is curved with less convexity and slopes toward the share at a gentle incline or angle to the ground, as at $g$. As it approaches the landside of the plow, the deeper convexity of the working-surface of the mold-board diminishes gradually, and at the line $x\,x$ of Fig. 2, and as shown more clearly in Fig. 7 of the drawings, the configuration in longitudinal vertical section of the mold-board is in one continuous curve of approximately the same convexity, which, however, does not form an arc of a circle throughout its complete area, the section of the mold-board near the landside on the said line $x\,x$ being arranged at a steep incline or angle as compared with the opposite end thereof. It will thus be seen that the working-surface of the mold-board is made of unequal convexity in longitudinal vertical section, and in transverse horizontal section it is made undulating in form, and by the approximately-vertical portion $f$ at the point of delivery of the furrow-slice the latter is completely overturned or capsized when it leaves the mold-board. When the furrow-slice traverses or rides over the unequal convex and undulatory curves in longitudinal and transverse section of the working surface of the mold-board, it partakes of the curves of the said surfaces, and is thereby subjected to a compound movement throughout its entire area, which serves to disarrange the particles thereof and break the furrow-slice, and as it rapidly approaches the approximately vertically disposed or arranged point of delivery of the mold-board, at the upper edge thereof, it is completely overturned or capsized, whereby the furrow-slice is effectually broken up and deposited on the ground in a thoroughly-pulverized state, and of proper height for planting cotton-seed therein and protecting them from excessive moisture during the spring-time, to which service my improved plow is especially adapted.

I attach especial importance to making the working-surface of a mold-board of unequal convexity and undulatory in longitudinal and transverse section, and to arranging the point of delivery of the furrow-slice in an approximately-vertical line, as therein lies the gist of the invention.

Having thus described my invention, I claim—

1. A mold-board for plows having its working-surface formed into curves of unequal radii, the middle being bulged and curved outwardly in horizontal transverse section, and gradually diminishing in curvature toward its upper and lower edges, where it is formed in nearly-straight lines, as and for the purpose set forth.

2. A mold-board for plows arranged or set at an angle of forty-five degrees (45°) to the line of draft, and having its entire area of working-surface formed into curves of unequal radii, the middle being bulged outwardly in horizontal transverse section and gradually decreasing toward its upper and lower edges, and of unequal convexity in longitudinal vertical section from the landside toward its opposite edge, with its delivery-point $f$ in substantially a vertical line, and a deep convex surface, $e$, at its middle in vertical section, as and for the purpose set forth.

In testimony that I claim the foregoing as my own I have hereto affixed my signature in presence of two witnesses.

GEORGE A. KELLY.

Witnesses:
 C. P. CARTER,
 G. B. HINES.